(12) United States Patent
Hoarau et al.

(10) Patent No.: US 8,373,883 B2
(45) Date of Patent: Feb. 12, 2013

(54) SYSTEM AND METHOD FOR MANAGING RESOURCE CONSUMPTION DURING PRINT PRODUCTION

(75) Inventors: Eric Hoarau, San Francisco, CA (US); Ingeborg Tastl, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 698 days.

(21) Appl. No.: 12/571,410

(22) Filed: Sep. 30, 2009

(65) Prior Publication Data

US 2011/0075197 A1 Mar. 31, 2011

(51) Int. Cl.
- *H04N 5/68* (2006.01)
- *G06K 3/12* (2006.01)
- *G06K 15/00* (2006.01)
- *G06F 3/12* (2006.01)
- *B41J 2/21* (2006.01)
- *B41J 2/205* (2006.01)
- *B41J 29/393* (2006.01)

(52) U.S. Cl. ............. 358/1.15; 358/1.14; 358/1.13; 347/43; 347/15; 347/19; 348/577

(58) Field of Classification Search ........... 358/1.15, 358/1.14; 348/577; 382/162; 347/43
See application file for complete search history.

(56) References Cited

U.S. PATENT DOCUMENTS

| | | | | |
|---|---|---|---|---|
| 5,469,533 A | * | 11/1995 | Dennis | 358/1.15 |
| 5,719,639 A | * | 2/1998 | Imamura | 348/577 |
| 6,527,366 B1 | * | 3/2003 | Byers et al. | 347/43 |
| 7,148,977 B2 | * | 12/2006 | Zerza et al. | 358/1.14 |
| 8,139,245 B2 | * | 3/2012 | Tian | 358/1.15 |
| 2002/0036799 A1 | * | 3/2002 | Sumiyama et al. | 358/1.15 |
| 2002/0059106 A1 | * | 5/2002 | Tani | 705/26 |
| 2002/0105668 A1 | * | 8/2002 | Lilland et al. | 358/1.14 |
| 2002/0140959 A1 | * | 10/2002 | Harper | 358/1.13 |
| 2003/0043231 A1 | * | 3/2003 | Byers et al. | 347/43 |
| 2004/0027611 A1 | * | 2/2004 | Leiman et al. | 358/1.15 |
| 2007/0273917 A1 | * | 11/2007 | Encrenaz et al. | 358/1.15 |
| 2010/0067782 A1 | * | 3/2010 | Dunn et al. | 382/162 |

\* cited by examiner

*Primary Examiner* — Akwasi M Sarpong
(74) *Attorney, Agent, or Firm* — Lloyd Dakin

(57) ABSTRACT

A system and method is disclosed for managing resource consumption during print production. The method discloses receiving a print job and a set of print job constraints; calculating a set of printing resources required to produce a print job output from the print job according to the set of print job constraints; measuring a set of available printing resources; producing the print job output from the print job, if the required printing resources are less than the available printing resources; and identifying a set of fall-back print job constraints and repeating the calculating and producing steps using the fall-back constraints, if the required printing resources are greater than the available printing resources. The system discloses various modules for effecting the method and including: a processor, a color transformation module, a printing resource module, a printing module, and a print job dialog module.

18 Claims, 4 Drawing Sheets

Print Job Profile 106

| Print Job Constraints 104 | Constraint Value 202 |
|---|---|
| Output Quality | High (*default*); Medium; Low; |
| Permitted "Color Separation" Techniques | Static (*default*); Specific Color Transpositions; Content Dependent; Dynamic; |
| Permitted "Resource Substitutions" | None (*default*); Media-A <> Media-B; Finish-A <> Finish-B or No-Finish; |
| Multi-Part Print Job - % Completion Required | All Parts Must Print (*default*); X% of Parts Must Print; |

Fig. 2

Resource Calculation Constraints 302

| Printing Resource Attribute 304 | Attribute Value 306 |
|---|---|
| Temporal Scope | Per Print Job;<br>Per Set of Print Jobs;<br>Per Predicted Usage Data; |
| Resource Scope | Individual Resource Level;<br>Set of Resource Levels; |
| Optimization Themes | Minimize Maintenance Costs;<br>Minimize Replacement Costs; |

Fig. 3

SYSTEM AND METHOD FOR MANAGING RESOURCE CONSUMPTION DURING PRINT PRODUCTION

BACKGROUND OF THE INVENTION

1. Field of the Invention

The present invention relates generally to systems and methods for print production, and more particularly to managing resource consumption during print production.

2. Brief Background Discussion

Modern print production systems rely on significant quantities of printing resources, such as ink, paper, and other specialty items. Such resources are costly but critical, particularly as print production processes are automated and strive for improvements in efficiency and profitability. Systems and methods for managing and wisely using such print resources are needed.

BRIEF DESCRIPTION OF THE DRAWINGS

Some embodiments of the invention are described, by way of example, with respect to the following figures:

FIG. 2 is a data structure diagram of one embodiment of a print job profile within the system;

FIG. 3 is a data structure diagram of one embodiment of a set of printing resource constraints within the system.

DETAILED DESCRIPTION OF THE PREFERRED EMBODIMENT

Figure 1:
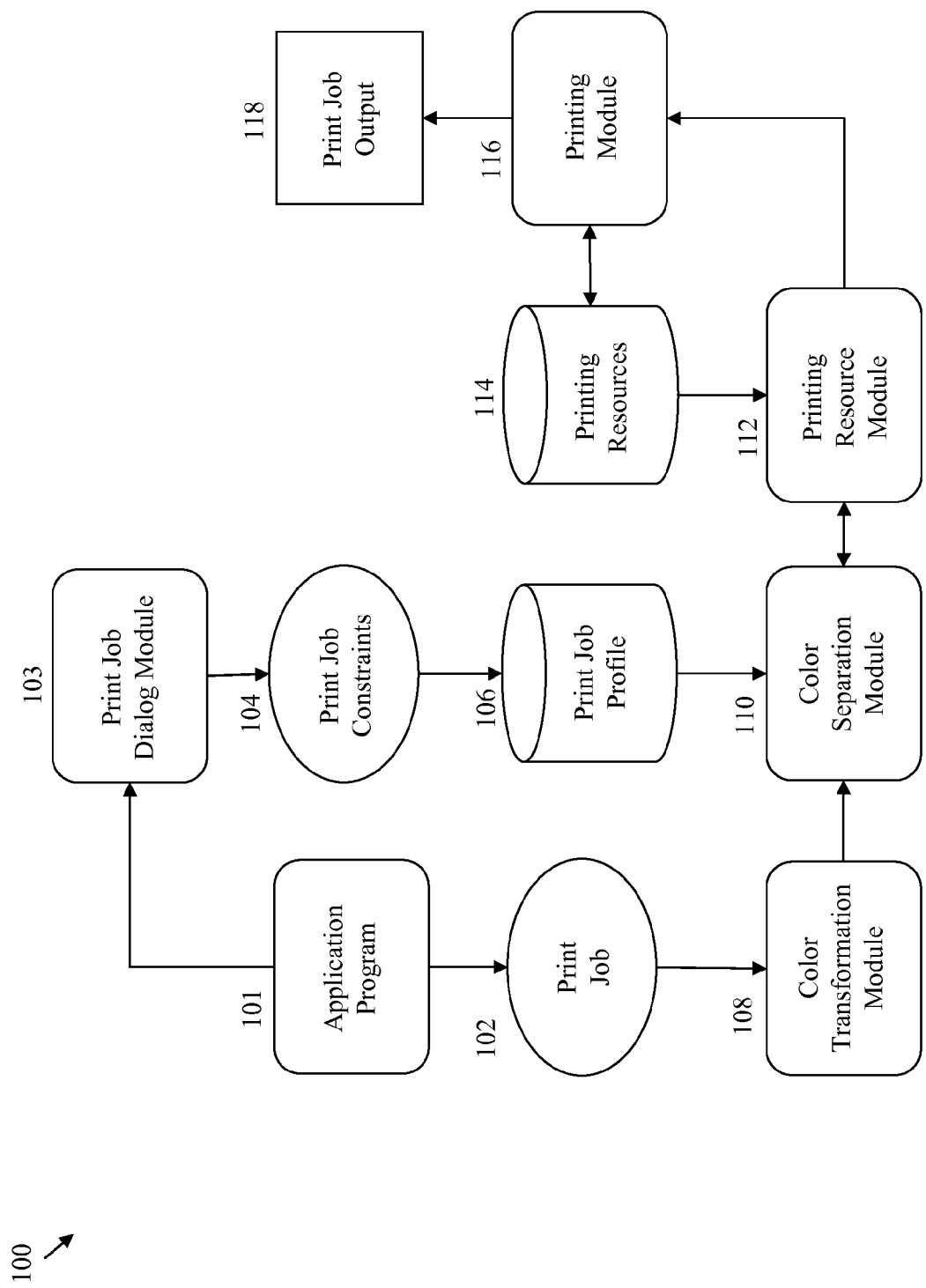
FIG. 1 is one embodiment of a system for managing resource consumption during print production.

For most commercial users, running out of one or more printing resources, such as ink, paper, or coatings, in the "middle" of a small-format or short-run print production job (e.g. just a few pages from a deskjet printer) and having to discard just one or two 8½ inch×11 inch sheets of paper, or resubmit the print job to a printer, tends not to be a significant concern.

However, should a commercial user run out of a printing resource in the "middle" of a large-format print job (e.g. multiple 8 foot×11 foot billboard sheets), or during a long-run print job (e.g. having hundreds of pages printed with perhaps multiple finishing steps) and having to throw away such large-format media, or several hundred pages of partially finished sheets in a long-run job, tends to greatly concern those engaged in such commercial print production endeavors. In such large-format/long-run print production jobs the print output is only partially printed, includes variably degraded colors with significant color-non-uniformity, or is missing colors or finishing steps all together. Such large-format/long-run printing disruptions results in a waste of costly ink, media stock, finishing chemicals, and time, each of which have already been consumed in significant amounts. Such wasteful resource use is also very undesirable from a disposal and environmental point of view as well. These concerns are even more magnified for consumer users who may be quite upset even when a few 8½ inch×11 inch color pages are not properly printed.

Current attempts to avoid such wasteful use of print production resources include providing a warning when: an ink cartridge runs low on ink (e.g. with 5-10% ink remaining); or a print tray is low on media stock (e.g. perhaps with only 5 to 10 sheets of paper remaining).

Such warnings however either tend to be ignored until either the cartridge or print tray is completely empty, resulting in incomplete, wasteful printing as described above. Even those who do attend to such warnings incur costs and generate waste, such as: by incurring maintenance costs replenishing trays not yet fully empty; and prematurely disposing of near empty cartridges having otherwise usable amounts of ink left.

In response to the concerns discussed above, what is needed is a system and method for print production that overcomes these problems.

The present invention addresses and remedies many, if not all, of the problems discussed above. The present inventions employs a multi-pronged strategy for adapting to a scarcity of printing resources while maintaining a given quality of print job output, that goes beyond just providing a warning. These prongs include: varying an output quality of the print job; identifying an acceptable set of resource substitutions which can be used to produce the print job; varying a percentage (%) print job completion for multi-part print jobs; and varying color separation of inks so that colors can be substituted for each other if necessary.

For example, the present invention uses the speed of modern GPU-based RIPs (i.e. Graphic Processing Unit based Raster Image Processors) to perform color separation in a new dynamic way, instead of just using static techniques. Dynamic color separation mixes a set of available inks (e.g. about 5 to 12 inks for modern printers), in real-time, to replace depleted ink combinations using the remaining inks to achieve a color reproduction that is as close as possible to the originally intended color reproduction.

Thus using the present invention, print production jobs can often be successfully completed using less than a complete set of printing resources by either reproducing or finding close substitutes for otherwise unavailable printing resources. This invention helps to avoid a waste of ink, paper, and time which often happens when one or more printing resources unexpectedly runs out in the middle of a print production job. The present invention also enables a larger percentage of ink in a set of cartridges to be used before incurring not only the cartridge replacement costs, but also the maintenance costs of serially replacing cartridges one by one, and the cartridge calibration and set-up costs in ink, paper, and time. Using the present invention a whole set of cartridges and other printing resources can now more often be replaced and calibrated in parallel at the same time.

Details of the present invention are now discussed.

FIG. 1 is one embodiment of a system 100 for managing resource consumption during print production. FIG. 2 is a data structure diagram 200 of one embodiment of a print job profile 106 within the system 100. FIG. 3 is a data structure diagram 300 of one embodiment of a set of printing resource constraints 302 within the system 100. To facilitate understanding, FIGS. 1, 2 and 3 are discussed together.

To begin, an application program 101 generates a print job 102. The print job 102 is a file which contains material to be rendered (e.g. printed), such as a photo, image, document, publication, brochure, and/or the like. Embedded in the print job 102 is typically a set of attributes/"resource tags" such as: color tags, finishing tags, media type tags, and so on, that define various colors, finishes, and on what media to print the print job 102.

In one embodiment of the present invention, the application program 101 also interfaces with a print job dialog module 103 to generate a set of print job constraints 104 and constraint values 202 (as shown in FIG. 2), before the print job 102 is submitted. The print job constraints 104 include: print job output quality; a set of permitted color separation techniques; a set of permitted resource substitutions; and multi-part print job percentage (%) completion required. Those skilled in the art will recognize other print job constraints 104 that may be used as well. The attribute values 204 associated with these print job attributes 202 are discussed below in the context of the present invention.

Note that in another embodiment of the present invention, this set of print job constraints 104 are instead created in response to a warning message from the system 100, after the print job 102 has been submitted. This will be discussed further below. In either embodiment, the print job constraints 104 and constraint values 202 are stored in print job profile 106 storage device.

A color transformation module 108 receives the print job 102. The color transformation module 108 translates the print job's 102 "color tags" into an equivalent set of "device-specific pixel color specifications" (e.g. pRGB or CMYK) using either the rendering device's (e.g. printer) specific color transformation table or an ICC (International Color Consortium) profile. The ICC profile conforms to a color management standard for specifying a rendering device's (e.g. imaging device, such as a scanner, monitor, digital camera, printer, etc.) capabilities and limitations so that the colors produced by the rendering device generate colors which are true to the color tags specified in the print job 102. The color transformation is typically only performed once for each print job 102.

A color separation module 110 receives the print job 102 and the corresponding set of "device-specific pixel color specifications" identified by the color transformation module 108. The color separation module 110 accesses a set of default print job constraints 104 stored in the print job profile 106 which correspond to the print job 102. The default print job constraints 104 are: Output Quality—High; Permitted Color Separation Techniques—Static Color Separation; Permitted Resource Substitutions—None; and Multi-Part Print Job—Percentage Completion Required—All/100%. Those skilled in the art recognize that the set of default print job constraints 104 can vary with different types of print jobs 102, and identifying sets of acceptable print job constraints 104 will likely require some content analysis within the print job 102. With such "content analysis", the print job constraints 104 can be made to vary from page to page, photo to photo, table to table, and various content mixes thereof. In another embodiment of the invention, there can be a separate set of draft print job constraints 104, for intentionally printing out a, printing resources 114 conserving, draft quality print job 102 output.

More detail on these print job constraints 104, their constraint values 202, and their meaning associated with these constraint values 202 is now provided. In alternate embodiments of the invention, a different set of print job constraints 104, constraint values 202, and meanings are possible The "Output Quality" constraint, in one embodiment of the present invention, has a constraint value 202 of either: High (default); Medium; or Low. These Output Quality levels could correspond to a "pixel density" per unit area on the media used to render the print job 102. Low Quality can be either a lower amount of ink per unit area or fewer pixels per unit area, and High Quality either a greater amount of ink per unit area, a greater number of pixels per unit area, or a more accurate color reproduction.

The "Permitted Color Separation Techniques" constraint, in one embodiment of the present invention, has a constraint value 202 of either: Static (default); Specific Color Transpositions; Content Dependent; or Dynamic.

With "Static Color Separation", the color separation module 110 separates the set of "device-specific pixel color specifications" provided by the color transformation module 108 into a set of "ink color amounts", for each of the inks used in the device, according to a fixed set of print production attributes. Those skilled in the art are aware of various static color separation techniques.

With "Specific Color Transpositions", the color separation module 110 is instructed to first replace one or more of the "device-specific pixel color specifications" provided by the color transformation module 108 with a "different device-specific pixel color specification" before performing either static or dynamic color separation. For example: a black color could be replaced with a dark blue color; a light orange could be replaced with a yellow color; a background only color could just not be printed, and so on.

With "Content Dependent" color separation, the color separation module 110 is instructed to first replace one or more of the "device-specific pixel color specifications" with a "different device-specific pixel color specification" for a specific portion of the print job 102 before performing either a static or dynamic color separation is performed. For example: after a document analysis step, all of the black "text" in a print job could be replaced with a dark blue; all light orange "background color" in a print job could be replaced with a yellow color; all "tables" or "charts" in a print job could be printed in dark green instead of dark blue; and so on. This replacement can be performed after the depletion of one of the inks has been identified and a document analysis has identified the areas in which the depleted ink was supposed to be used. If one of those areas is a background area and "Content Dependent" has been chosen it can be replaced by another color using the existing inks. A "print preview" is also provided so that the replacement can be verified as acceptable.

With "Dynamic Color Separation", the color separation module 110 separates the set of "device-specific pixel color specifications" provided by the color transformation module 108 in into a set of "ink color amounts" according to a variable set of print production attributes. More specifically, certain "device-specific pixel color specifications" that using static color separation would be printed with a first set of inks, are instead produced by a second set of inks which are different from the first set of inks but also result in the same or similar colorimetric values (e.g. CIELAB values). Modern inkjet printers typically use more than 4 different inks, while others use up to 12 different inks. Thus, many of the colors in an sRGB gamut, especially colors closer to the center of the gamut can be reproduced by several different ink combinations. A static color separation tries to optimize several different image quality attributes like smoothness of color transitions, graininess and so on. Normally, the separation is built and tested off-line and used in a static form. However, having the extra computational power of a GPU-RIP, a static separation can be replaced by a dynamic separation if needed. Specifically, a static separation which uses all "n" available inks is replaced by a separation which uses "n-1" inks or fewer. Such alternative color separations can either be calculated in advance and stored, or alternatively, calculated in real-time using the device's characterization data. As indicated above, colors that are in a center of a device gamut can be reproduced in many different ways. However, colors that are on the border of the gamut (e.g. pure Magenta) can only be reproduced in one specific way. Such "on the border" colors (e.g. pure Magenta) are thus approximated by a color which results from using the remaining "n-1" inks. From that set the closest approximation will be chosen. The second set of inks are chosen such that a print job output 118 generated by the printing module 116 using the second set of inks would look either the same or nearly the same had the printing module 116 used the first set of inks. Thus the print job's 102 "device-specific pixel color specifications" can be alternatively reproduced using different ink combinations. This works under an assumption that more than 3-4 color inks are available for printing.

Dynamic color separation is preferably implemented on a pixel by pixel basis using a GPU-based RIP (Graphic Processing Unit based Raster Image Processor) in real-time as printing resources 114 are being consumed. In this way, as printing resources 114 are depleted (e.g. inks run empty) the color separation module 110, using Dynamic color separation, and selects a different set of inks to blend so as to compensate for the ink that is no longer available. GPU-based RIPs use a parallel architecture to provide increased computational resources, thereby enabling real-time control over the computationally intensive color separation process.

The "Permitted Resource Substitutions" constraint, in one embodiment of the present invention, has a constraint value 202 of either: None (default); Media-A < > Media-B; or Finish-A< > Finish-B (where "Finish-B" could also be "No-Finish"). "None" refers to using those printing resources 114 which were originally specified in the print job 102.

Media-A<>Media-B means that one Media (i.e. Media-B) can be substituted for another Media (i.e. Media-A) that either is no longer available, whose level is below a minimum threshold, or if the media is not adequate for the ink quality setting.

Also, Finish-A<>Finish-B means that one Finish Coating (i.e. Finish-B) can be substituted for another Finish Coating (i.e. Finish-A) that either is no longer available or whose level is below a minimum threshold. In embodiments of the invention where Finish-A< > No-Finish, the Finish decision is binary and each Finish can either be used or not. For example, normally there is only one "gloss enhancer" Finish in a printer. However, if the gloss enhancer is running-low the print job constraints 104 could specify that the gloss enhancer will only be used over Images/Photos, and not over Text or Graphics.

To facilitate identification of an acceptable set of Resource Substitutions, the print job dialog module 103 provides a list of "recommended substitutions", which are visually close to the selections originally specified in the print job 102, for the application program 101 to choose from.

The "Multi-Part Print Job—Percentage Completion Required" constraint, in one embodiment of the present invention, has a constraint value 202 of either: All Parts Must Print (default); or X % of Parts Must Print. "All Parts Must Print" means that the print job 102, and all of its sub-parts must be able to be printed. Thus a print job 102 can include multiple files, documents, pages of photos, etc. "X % of Parts Must Print" means that only X % (e.g. 50%) of the print job 102 must print. For example, if X % is 50%, and if the print job 102 included 10 files, only 5 files would need to print.

As introduced earlier, the print job constraints 104 are, in one embodiment, solicited from the application program 101 by the print job dialog module 103 before the print job 102 is submitted. This is to speed the print production workflow so that the print job 102 can be printed without holding up other print jobs in the queue. The print job constraints 104 are specified using a "dialog" between the print job dialog module 103 and the application program 101. In response to selections by the application program 101, the print job dialog module 103 generates a "print preview" showing the effects of selecting various print job constraints 104.

Using a question, answer, and print preview dialog process, the print job dialog module 103 creates not only the default set of constraints, but also a series of fall-back constraints, perhaps labeled: tier 2, tier 3, and so on. These fall-back constraints permit the production of the print job 102 to be gracefully degraded under the direction of the application program 101. One of these tiers will likely specify that the print job 102 shall not be produced, since any print job output 118 generated from the print job 102 would fall below a minimum acceptable level specified by the application program 101, and thus should not be printed until there are sufficient printing resources 114 to do so. This "dialog" with application program 101, can in the alternate embodiment (also mentioned above) occurs after the print job 102 is submitted to the color transformation module 108, in response to a warning message.

The color separation module 110 then applies the default print job constraints 104 to the print job 102 and generates an default set of color separation information by decomposing the print job 102 into a set of ink amounts and a set of finish amounts corresponding to the media (e.g. paper stock) specified by the print job 102.

A printing resource module 112 receives the default set of color separation information and then calculates a set of required quantities of the various printing resources 114 required for the printing module 116 to produce a print job output 118 from the print job 102 based on the default set of color separation information.

The printing resources 114 are those resources available within the system 100 for generating print job outputs 118. The printing resources 114 include a set of colored inks, a set of finishing coatings, a set of media (e.g. paper stock), and so on depending upon the types of print job outputs 118 the print production system 100 was designed to produce.

The printing resource module 112 calculates the set of required quantities of the printing resources 114 according to a predetermined set of resource calculation constraints 302. The resource calculation constraints 302 are preferably not print job 102 specific, but are instead defined by a system 100 manager tasked with maintaining and replacing the printing resources 114. The resource calculation constraints 302 are stored with the printing resources 114 and include printing resource attributes 304, and attribute values 306.

The printing resource attributes 304 include: a Temporal Scope; a Resource Scope; and a set of Optimization Themes. The attribute values 306 for the Temporal Scope include: Per Print Job; Per Set of Print Jobs; and Per Predicted Usage Data. Using the Temporal Scope constraint, the printing resource module 112 determines whether there are enough printing resources 114 to complete just one print job, a whole set of print jobs, or over a predefined period assuming a historical printing resources 114 usage pattern. For example, if only a portion of a set of print jobs from a customer can be printed, then the system 100 may incur a cost for warehousing the partially completed customer order while new ink supplies are being ordered or installed. In another example, if a set of marketing posters must be printed, is there enough of each ink to print the whole set of posters, or can either the color separation be changed or can a more even ink usage be created if one color is too much used, so that all of the posters can be printed.

The attribute values 306 for the Resource Scope include: an Individual Resource Level; and a Set of Resource Levels. Using the Resource Scope constraint, the printing resource module 112 determines whether there are enough printing resources 114 based on just one print resource, or a whole set of print resources.

The attribute values 306 for the Optimization Themes include: Minimize Maintenance Costs; and Minimize Replacement Costs. Using the Optimization Themes constraint, the printing resource module 112 determines whether there are enough printing resources 114 based on an overall goal of minimizing "maintenance costs" (e.g. system 100 down time to replace ink cartridges), or minimizing "replacement costs" (e.g. the actual cost of purchasing one or more ink cartridges).

Thus using the resource calculation constraints 302, the printing resource module 112 could determine that there are "not enough" printing resources 114, thereby shifting the print job 102 to tier 2, tier 3, etc. print job constraints 104 even before any of the printing resources 114 is no longer available.

Next the printing resource module 112 measures a set of available quantities of the various printing resources 114. In one embodiment of the invention, these measurements can incorporate information from various level sensors stationed at each of the printing resources 114.

If the required quantity of printing resources 114 is less than or equal to the available printing resources 114, then there are "enough" printing resources 114 to produce a print job output 118 from the print job 102, and the printing resource module 112 permits the printing module 116 to generate the print job output 118 corresponding to the print job 102.

Otherwise, if the calculated amount is greater than the available amount, then there are "not enough" printing resources 114. In this scenario, the printing resource module 112 either instructs the color separation module 110 to search the print job constraints 104 in the print job profile 106 for a fall-back tier 2 associated with the print job 102, or if such a set of print job constraints 104 has not yet been created, transmit a warning message back to the application program 101. The print job dialog module 103 will then engage the application program 101 in a dialog (described above) which will then generate a set of print job constraints 104, containing tier 2, tier 3, etc. fall-back printing options.

If such a fall-back tier 2 is identified, then the color separation module 110 applies the tier 2 print job constraints 104 to the print job 102 and generates an tier 2 set of color separation information by decomposing the print job 102 into a set of ink amounts and a set of finish amounts corresponding to the media (e.g. paper stock) specified by the print job 102.

The printing resource module 112 then receives the tier 2 set of color separation information and now calculates a tier 2 set of required quantities of the various printing resources 114 required for the printing module 116 to produce a print job output 118 from the print job 102 based on the tier 2 set of color separation information.

Similarly, if the required quantity of printing resources 114 are now less than or equal to the available printing resources 114, then there are "enough" printing resources 114 to produce a print job output 118 from the print job 102, and the printing resource module 112 permits the printing module 116 to generate the print job output 118 corresponding to the print job 102.

However, if the calculated amount is greater than the available amount, then there are still "not enough" printing resources 114. In this scenario, the printing resource module 112 instructs the color separation module 110 to search the print job constraints 104 in the print job profile 106 for a fall-back tier 3 associated with the print job 102.

This cycle repeats until either a fall-back tier is identified which permits the printing module 116 to generate the print job output 118 corresponding to the print job 102, or until the tier information states that the print job 102 should be halted and printing stopped until the printing resources 114 can be replenished. This saves any remaining print resources 114 so that they are not wasted on an incomplete print job.

Figure 4:
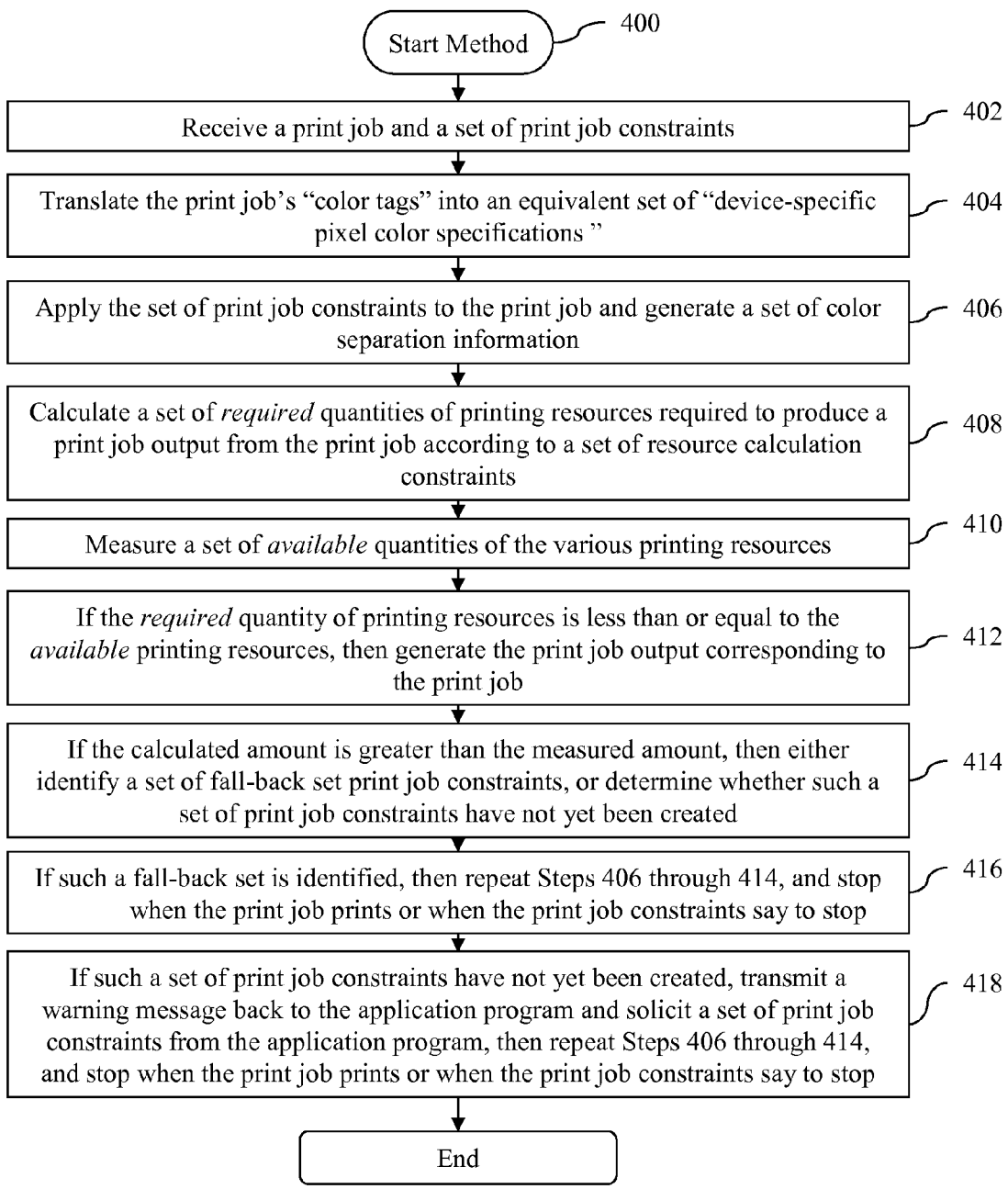
FIG. 4 is a flowchart of one embodiment of a method for managing resource consumption during print production.

FIG. 4 is a flowchart of one embodiment of a method 400 for managing resource consumption during print production. Those skilled in the art will recognize that while one embodiment of the present invention's method is now discussed, the material in this specification can be combined in a variety of ways to yield other embodiments as well. The method steps next discussed are to be understood within a context provided by this and other portions of this detailed description.

The method 400 begins in step 402, by receiving a print job 102 and a set of print job constraints 104 from an application program 101. Next in step 404, a color transformation module 108 translates the print job's 102 "color tags" into an equivalent set of "device-specific pixel color specifications". In step 406, a color separation module 110 applies the set of print job constraints 104 to the print job 102 and generates a set of color separation information.

Then in step 408, a printing resource module 112 receives the set of color separation information and calculates a set of required quantities of the various printing resources 114 required for a printing module 116 to produce a print job output 118 from the print job 102 according to a predetermined set of resource calculation constraints 302. In step 410, the printing resource module 112 measures a set of available quantities of the various printing resources 114.

In step 412, if the required quantity of printing resources 114 is less than or equal to the available printing resources 114, then there are "enough" printing resources 114 to produce a print job output 118 from the print job 102, and the printing resource module 112 permits the printing module 116 to generate the print job output 118 corresponding to the print job 102.

However, in step 414, if the calculated amount is greater than the available amount, then there are "not enough" printing resources 114, and the printing resource module 112 either instructs the color separation module 110 to search the print job constraints 104 in the print job profile 106 for a fall-back set associated with the print job 102, or determine if such a set of print job constraints 104 has not yet been created.

In step 416, if such a fall-back set is identified, then repeat Steps 406 through 414, and stop when the print job prints or when the print job constraints say to stop. In step 418, however, if such a set of print job constraints have not yet been created, transmit a warning message back to the application program and solicit a set of print job constraints from the application program, then repeat Steps 406 through 414, and stop when the print job prints or when the print job constraints say to stop.

This cycle repeats until either a fall-back set is identified which permits the printing module 116 to generate the print job output 118 corresponding to the print job 102, or until the tier information states that the print job 102 should be halted and printing stopped until the printing resources 114 can be replenished.

A set of files refers to any collection of files, such as a directory of files. A "file" can refer to any data object (e.g., a document, a bitmap, an image, an audio clip, a video clip, software source code, software executable code, etc.). A "file" can also refer to a directory (a structure that contains other files).

Instructions of software described above are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method, executed by a computer, for managing resource consumption during print production, comprising:
    receiving a print job and a set of print job constraints, wherein the print job includes a first pixel color specification, and the print job constraints include a content dependent constraint, which permits the first pixel color specification to be replaced with a second pixel color specification for specific content types in the print job;
    generating a set of color separation information by applying the set of print job constraints to the print job, wherein the generating comprises generating a first set of color separation information using the first pixel color specification;
    calculating a set of printing resources required to produce a print job output from the print job according to the set of print job constraints, wherein calculating includes, calculating the required printing resources based on the set of color separation information;
    measuring a set of available printing resources;
    producing the print job output from the print job, if the required printing resources are less than the available printing resources; and
    if the required printing resources are greater than the available printing resources,
        identifying a set of fall-back print job constraints, wherein the identifying comprises identifying different types of content in the print job, and the generating comprises generating a second set of color separation information for at least one of the different types of content in the print job; and
        repeating the calculating and producing steps using the fall-back constraints, wherein the producing comprises using the second set of color separation information for at least one of the different types of content in the print job and using the first set of color separation information for other types of content in the print job.

2. The method of claim 1:
wherein the print job includes a pixel color specification;
wherein the print job constraints include a "dynamic color separation" constraint; and
wherein generating further includes:
    generating a first set of color separation information for rendering the pixel color specification using a first set of ink amounts; and
    generating a second set of color separation information for rendering the pixel color specification using a second set of ink amounts, in response to the "dynamic color separation" constraint, and the identifying step.

3. The method of claim 2:
wherein the first set of ink amounts and the second set of ink amounts have substantially equivalent colorimetric values.

4. The method of claim 1:
wherein the print job includes a first pixel color specification;
wherein the print job constraints include a "specific color transpositions" constraint, which permits the first pixel color specification to be replaced with a second pixel color specification; and
wherein generating further includes:
    generating a first set of color separation information using the first pixel color specification; and
    generating a second set of color separation information, using the second pixel color specification, in response to the "specific color transpositions" constraint and the identifying step.

5. The method of claim 1:
wherein the different types of content in the print job include: background, text, images, tables, and graphs.

6. The method of claim 1:
wherein the print job constraints include a "permitted resource substitutions" constraint, which permits a first printing resource to be replaced with a second printing resource; and
wherein generating further includes:
    generating a first set of color separation information using the first printing resource; and
    generating a second set of color separation information, using the second printing resource, in response to the "permitted resource substitutions" constraint and the identifying step.

7. The method of claim 6, further comprising:
providing a list of "recommended resource substitutions", to facilitate identification of an acceptable set of permitted resource substitutions.

8. The method of claim 6:
wherein permitted resource substitutions include at least one from a group including: None; Media-A <> Media-B; Finish-A <> Finish-B; and Finish-A <> No-Finish.

9. The method of claim 6:
wherein the printing resources include at least one from a group including: a set of inks, a set of media, and a set of finishing coating.

10. The method of claim 1:
wherein the print job constraints include a "multi-part print job—percentage completion required" constraint, which sets a minimum percentage of the print job which must be able to be printed using the set of available printing resources; and further comprising, stopping production of the print job output from the print job if the minimum percentage cannot be attained.

11. The method of claim 1:

wherein the print job constraints include an "output quality" constraint, which in the print job output sets a minimum amount of at least one from a group including: ink per unit area; pixels per unit area; and accurate color reproduction; and further comprising, stopping production of the print job output from the print job if the minimum amount is not available.

12. The method of claim 1, wherein receiving includes:

determining whether the set of print job constraints have been created;

soliciting the set of print job constraints from an application program, if the set of print job constraints have not yet been created; and generating a "print preview" showing effects of selecting various constraints for the set of print job constraints.

13. An article comprising at least one non-transitory computer-readable storage medium containing computer instructions that, when executed by a computer system, cause the computer system to perform operations comprising:

receiving a print job and a set of print job constraints, wherein the print job includes a first pixel color specification, and the print job constraints include a content dependent constraint, which permits the first pixel color specification to be replaced with a second pixel color specification for specific content types in the print job;

generating a set of color separation information by applying the set of print job constraints to the print job, wherein the generating comprises generating a first set of color separation information using the first pixel color specification;

calculating a set of printing resources required to produce a print job output from the print job according to the set of print job constraints, wherein calculating includes, calculating the required printing resources based on the set of color separation information;

measuring a set of available printing resources;

producing the print job output from the print job, if the required printing resources are less than the available printing resources; and if the required printing resources are greater than the available printing resources, identifying a set of fall-back print job constraints, wherein the identifying comprises identifying different types of content in the print job, and the generating comprises generating a second set of color separation information for at least one of the different types of content in the print job; and repeating the calculating and producing steps using the fall-back constraints, wherein the producing comprises using the second set of color separation information for at least one of the different types of content in the print job and using the first set of color separation information for other types of content in the print job.

14. The article of claim 13:

wherein the print job is transformed into a pixel color specification;

wherein the print job constraints include a "dynamic color separation" constraint;

further including:

generating a first set of color separation information for rendering the pixel color specification by applying the set of print job constraints to the print job using a first set of ink amounts; and generating a second set of color separation information for rendering the pixel color specification using a second set of ink amounts, in response to the "dynamic color separation" constraint, and the identifying step; and wherein calculating includes, calculating the required printing resources based on the first and second sets of color separation information.

15. A system for managing resource consumption during print production, comprising:

a processor configured to operate a series of functional modules, wherein the modules comprise:

a color transformation module for receiving a print job and a set of print job constraints, wherein the print job includes a first pixel color specification, and the print job constraints include a content dependent constraint, which permits the first pixel color specification to be replaced with a second pixel color specification for specific content types in the print job;

a printing resource module for:

generating a set of color separation information by applying the set of print job constraints to the print job, wherein the generating comprises generating a first set of color separation information using the first pixel color specification;

calculating a set of printing resources required to produce a print job output from the print job according to the set of print job constraints, wherein calculating includes, calculating the required printing resources based on the set of color separation information; and measuring a set of available printing resources;

a printing module for producing the print job output from the print job if the required printing resources are less than the available printing resources; and a print job dialog module for identifying a set of fall-back print job constraints, if the required printing resources are greater than the available printing resources;

wherein if the required printing resources are greater than the available printing resources, the printing resource module performs operations comprising identifying different types of content in the print job, generating a second set of color separation information for at least one of the different types of content in the print job, and repeating the calculating and producing steps using the fall-back constraints, wherein the producing comprises using the second set of color separation information for at least one of the different types of content in the print job and using the first set of color separation information for other types of content in the print job.

16. The system of claim 15, further comprising:

a color separation module for applying the set of print job constraints to the print job and generating a set of color separation information.

17. The system of claim 16:

wherein the color separation module initially applies a static color separation to the print job, but which then applies a dynamic color separation to the print job, if the required printing resources are greater than the available printing resources using the static color separation.

18. The system of claim 16, wherein the color separation module further comprises:

a Graphic Processing Unit Based Raster Image Processor (GPU-based RIP) for dynamically generating the set of color separation information.

* * * * *